April 6, 1926.  1,579,760
L. T. GARDNER
DEVICE FOR LOCATING AND RAISING SUNKEN SUBMARINES
Filed Oct. 27, 1925   3 Sheets-Sheet 1

Inventor
Leonard T. Gardner
By E. Shalton Newington
Attorney

April 6, 1926.  1,579,760
L. T. GARDNER
DEVICE FOR LOCATING AND RAISING SUNKEN SUBMARINES
Filed Oct. 27, 1925   3 Sheets-Sheet 3
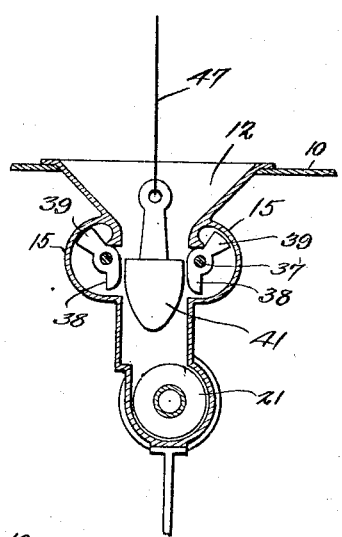
Fig. 9.
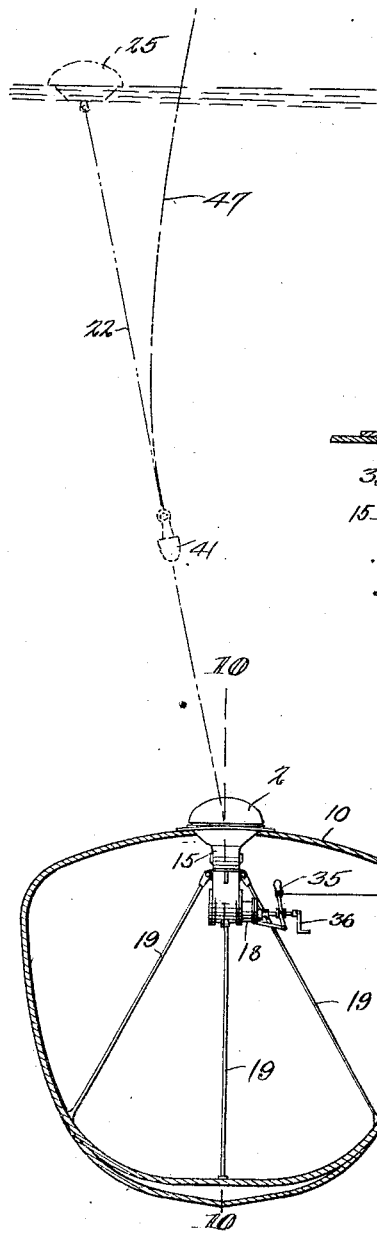
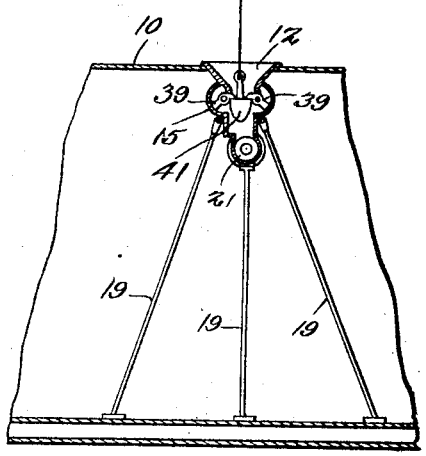
Fig. 10.
Fig. 8.
Inventor
Leonard T. Gardner,
By E. Halton Brewington
Attorney Patented Apr. 6, 1926.

1,579,760

UNITED STATES PATENT OFFICE.

LEONARD T. GARDNER, OF BALTIMORE, MARYLAND.

DEVICE FOR LOCATING AND RAISING SUNKEN SUBMARINES.

Application filed October 27, 1925. Serial No. 65,153.

*To all whom it may concern:*

Be it known that I, LEONARD T. GARDNER, a citizen of the United States, residing at Baltimore city, State of Maryland, have invented certain new and useful Improvements in Devices for Locating and Raising Sunken Submarines, of which the following is a specification.

This invention relates to devices for raising sunken submarines and has special reference to means for guiding a hoisting cable down to a submarine which has sunk and connecting the cable to such submarine upon its reaching the latter.

One important object of the invention is to provide an improved guide rope and buoy controlling mechanism for use in connection with such devices.

A second important object of the invention is to provide an improved arrangement of buoy and buoy holder in such devices.

A third important object of the invention is to provide an improved hoisting cable guide member and grip device for carrying a hoisting cable down to the submarine.

A fourth important object of the invention is to provide improved means on the submarine for engaging the grip device.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 8 is a cross section of a submarine equipped with this invention showing the buoy in full lines in the usual position and in dotted lines when the submarine is sunk.

Figure 9 is a detail view showing the clutch mechanism partly engaged.

Figure 10 is a section on the line 10—10 of Figure 8.

Figure 1:
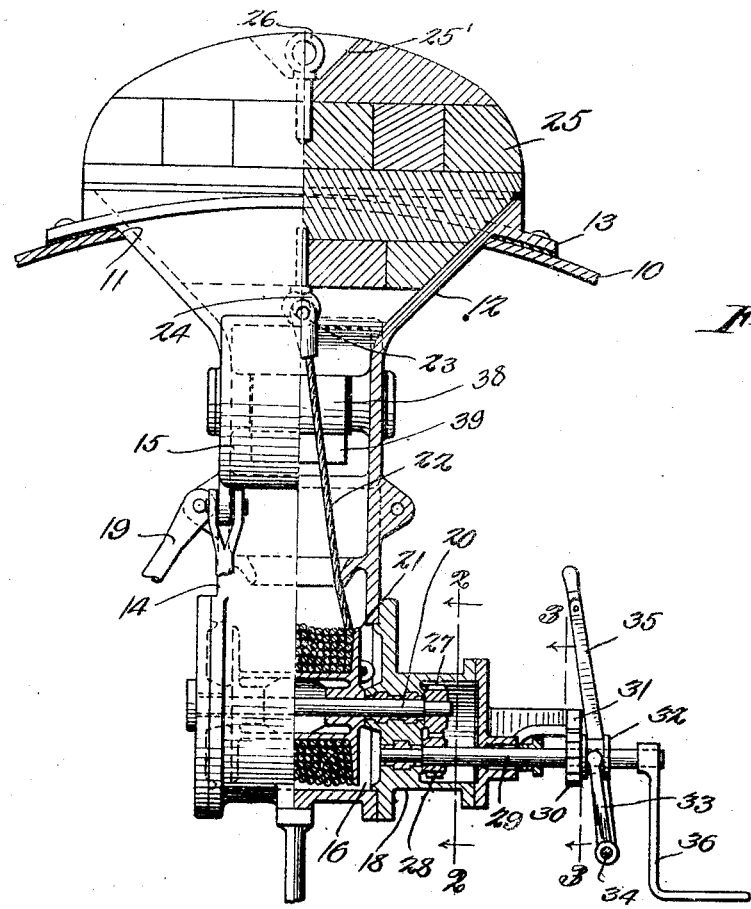
Figure 1 is a transverse section through the upper part of a submarine hull showing one of the complete devices in position, the same being shown partly in section and partly in elevation.
Figure 2:
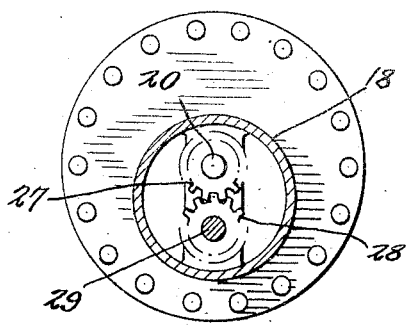
Figure 2 is an enlarged section on the line 2—2 of Figure 1.
Figure 3:
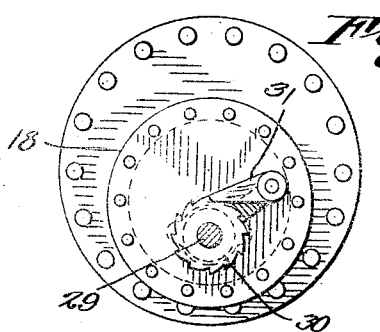
Figure 3 is an enlarged section on the line 3—3 of Figure 1.
Figure 4:
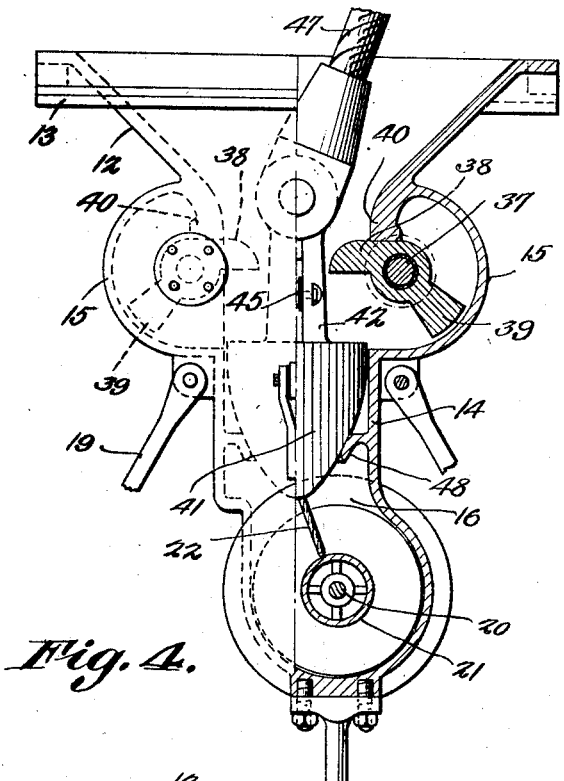
Figure 4 is a half elevation and half section of the device at right angles to Figure 1, the grip being shown engaged.
Figure 6:
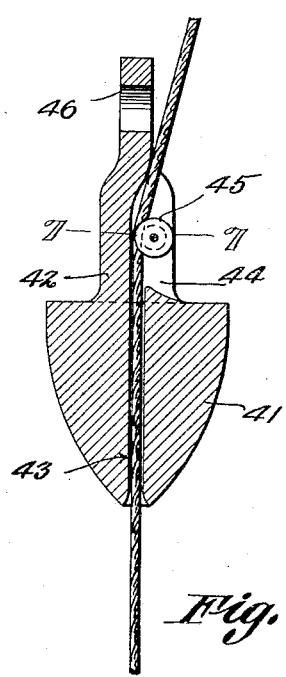
Figure 6 is an enlarged vertical section through the grip member.
Figure 5:
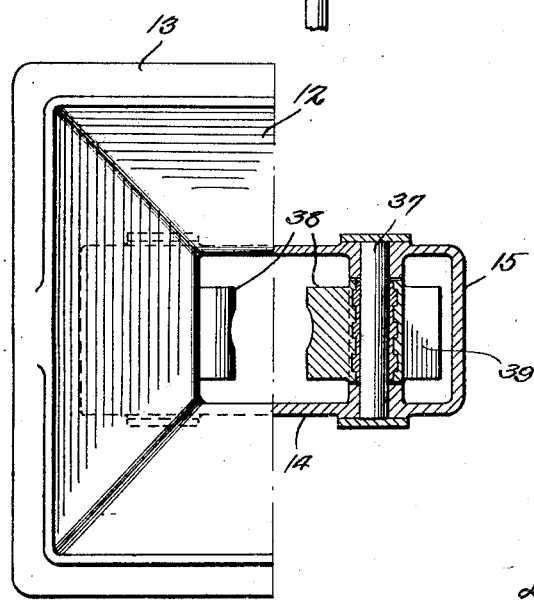
Figure 5 is a plan view partly in section showing the grip engaging members, the buoy and other parts being omitted.
Figure 7:
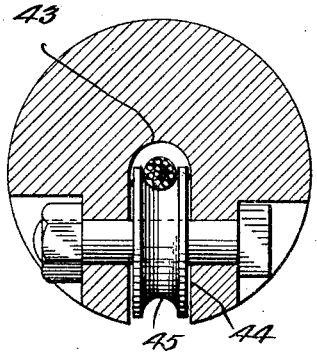
Figure 7 is an enlarged cross section of the grip member shank on the line 7—7 of Figure 6.

A portion 10 of the upper part of a submarine hull is provided with an opening 11 in which is seated the frusto-pyramidal upper part 12 of a casing having a flange 13 so secured to the outer side of the hull as to make a water and air tight joint. The casing is extended downwardly from the part 12 in rectangular tubular form 14, being provided with opposed substantially semi-cylindrical portions 15 just below the part 12. At the lower end of the casing there is provided an offset substantially cylindrical chamber 16 having one end closed by one end of a gear housing 18. This entire casing or main housing may be braced to suitable joints within the hull by brace rods 19. Journalled in the cover plate and gear housing is a drum shaft 20 on which is fixed a drum 21 having a buoy line 22 wound thereon, this buoy line forming a guide cable. This line passes upwardly in the casing and has its free end connected by a bolt 23 to an eye bolt 24 fixed in the bottom of a buoy 25 having its lower part conforming in shape and size to the upper part of the portion 12 of the casing and having its upper part rounded. Centrally of the top of the buoy is a well 25' wherein is an eye bolt 26 by aid of which the buoy may be hoisted on a rescue boat. One end of the shaft 20 projects within the gear housing and on this end is fixed a gear 27 with which meshes a gear 28 mounted on a shaft 29 revoluble and slidable in aligned bearings in the gear housing. This shaft carries, outside of the housing, a ratchet 30 wherewith engages a pawl 31. Also on the shaft is a shipper ring 32 engaged by a shipper lever 33 fixed to a shaft 34 actuated by a lever 35. It is obvious that the shaft 34 may be of any desired length so that the lever 35 may be positioned wherever convenient. On the end of the shaft 29 is a crank 36 which is used for rotating the shaft to actuate the drum. Axially of each extension runs a shaft 37 on which is tiltably mounted a grip engaging member having one end in the form of a pawl 38 provided with a flat underside and a curvedly beveled inner edge. Each pawl is provided with a counter weight 39 which normally holds the pawl up against a stop member 40 formed inwardly of the casing.

The grip member or plunger is provided with an ogival head 41 having a shank 42, a passage 43 being formed axially of the head and communicating with a slot 44 extending radially of the shank and having a guide roller 45 mounted therein. At the upper end of the plunger shank is an eye 46 to which may be shackled the end of a hoisting cable 47.

In order to understand the operation let it be supposed that a submarine equipped with one or more of these devices has sunk and cannot be raised by its own power. The buoy is released by pulling the lever 35 and rises to the surface where it may readily be seen. This buoy, being observed by a rescue vessel, is taken aboard the latter and the guide cable is led through the passage in the plunger, it being understood that such plungers are to be carried on all ships liable to be called on to raise a sunken submarine. The hoisting cable is shackled to the plunger and paid out so that the latter descends along the guide rope or cable and the plunger head enters the casing, being guided by the slanting sides, then depresses the pawls and brings up against a stop flange 48 which prevents injury to the drum. As soon as the head passes the pawls the latter assume their original position and the hoisting cable may now be led to a suitable winch or capstan and the submarine hoisted.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, and a plunger adapted to have a hoisting cable attached thereto and slidable on said guide rope, said plunger having a head engageable below said pawls and a shank adapted to pass between the pawls.

2. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, a plunger adapted to have a hoisting cable attached thereto and slidable on said guide rope, said plunger having a head engageable below said pawls and a shank adapted to pass between the pawls, means to wind said drum and means whereby the winding means may be quickly released from the drum.

3. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, a plunger adapted to have a hoisting cable attached thereto and slidable on said rope, said plunger having a head engageable below said pawls and a shank adapted to pass between the pawls, a shaft on which said drum is mounted, a gear fixed on said shaft, a second shaft, a gear on the second shaft normally engaging the first gear, and means to engage and disengage said gears.

4. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, a plunger adapted to have a hoisting cable attached thereto and slidable on said guide rope, said plunger having a head engageable below said pawls and a shank adapted to pass between the pawls, a shaft on which said drum is mounted, a gear fixed on said shaft, a second shaft, a gear on the second shaft normally engaging the first gear, said second shaft being slidably and rotatably mounted parallel to the first shaft, and means to shift the second shaft longitudinally.

5. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, a plunger adapted to have a hoisting cable attached thereto and slidable on said guide rope, said plunger having a head engageable below said pawls and a shank adapted to pass between the pawls, a shaft on which said drum is mounted, a gear fixed on said shaft, a second shaft, a gear on the second shaft normally engaging the first gear, said second shaft being slidably and rotatably mounted parallel to the first shaft, a shipper collar fixed on the second shaft, a shipper lever engaging the shipper collar, and means to actuate the shipper lever.

6. A device for raising sunken submarines comprising, a casing having an open end adapted to be secured to the upper part of a submarine hull with the open end upwardly and the lower end projecting within the submarine, a winding drum mounted in the lower part of the casing and having a buoy cable wound thereon, a buoy fixed to the end of the cable and normally seated in the upper end of the casing, a pair of pawls mounted in opposition intermediate the ends of said casing, means to limit the upward movement of said pawls, a plunger adapted to have a hoisting cable attached thereto and slidable on said guide rope, said plunger having a head engageable below said pawls and a shank adapted to pass between the pawls, a shaft on which said drum is mounted, a gear fixed on said shaft, a second shaft, a gear on the second shaft normally engaging the first gear, said second shaft being slidably and rotatably mounted parallel to the first shaft, a shipper collar fixed on the second shaft, a shipper lever engaging the shipper collar, means to actuate the shipper lever, a ratchet on said second shaft, and a pawl normally engaging the ratchet to hold it from rotation.

In testimony whereof I affix my signature.

LEONARD T. GARDNER.